Nov. 12, 1968    R. T. BECKER ETAL    3,410,415
SELF-PROPELLED DRUM SUPPORT
Filed Dec. 6, 1965    7 Sheets-Sheet 3

INVENTORS
ROGER T. BECKER
GEORGE R. PIERCE
BY
Woodhams, Blanchard & Flynn
ATTORNEYS

Nov. 12, 1968    R. T. BECKER ETAL    3,410,415
SELF-PROPELLED DRUM SUPPORT
Filed Dec. 8, 1965    7 Sheets-Sheet 5

INVENTORS
ROGER T. BECKER
GEORGE R. PIERCE
BY
ATTORNEYS

United States Patent Office 3,410,415
Patented Nov. 12, 1968

3,410,415
SELF-PROPELLED DRUM SUPPORT
Roger T. Becker and George R. Pierce, Kalamazoo, Mich., assignors to Aero-Motive Manufacturing Company, Kalamazoo County, Mich., a corporation of Michigan
Continuation of application Ser. No. 511,728, Dec. 6, 1965. This application Jan. 23, 1968, Ser. No. 699,974
23 Claims. (Cl. 212—21)

ABSTRACT OF THE DISCLOSURE

A self-propelled device and cooperating structure whereby unidirectional movement of the device can be effected along a predetermined path. The self-propelled device includes carriage-supporting motor means connected to a rotatable drum which is engageable with an elongated, flexible element having spaced portions relatively movable along said path. The drum is connected to actuating means and the carriage is mounted on track means whereby said element is continuously held under tension to remove slack therefrom as one said portion of the flexible element is moved with respect to the other.

---

This is a continuation of Ser. No. 511,728, filed Dec. 6, 1965, now abandoned.

This invention relates in general to a self-propelled device capable of urging itself along a predetermined path and, more particularly, capable of maintaining tension upon one or more elongated, flexible elements, each of which has at least one end thereof attached to a movable member.

There are numerous circumstances in industry and commerce where a piece of equipment, such as a tool, must be connected to a stationary source of power or energy and must also be capable of movement with respect to said source. Thus, the movable member is connected to the source by a flexible element such as a conduit or conductor. However, where the equipment must be moved relatively large distances, it is often desirable, if not essential, to control the position and movement of the element attached to the equipment being moved.

Attempts have been made to provide such control by employing various types of supports movable along a predetermined path, usually parallel with the path of movement of the equpiment, whereby the portion of flexible element in excess of the straight line distance between the fixed and movable ends thereof is gathered up or carried so that it will not interfere with the normal operation of the equipment or obstruct the movement of nearby workers or other equipment. However, to the best of our knowledge, the existing structures for handling the aforementioned flexible elements have been only partially satisfactory.

Many of the previous structures have been expensive, or difficult to install, or complicated to operate or costly to maintain. Most of the previous structures which have avoided these drawbacks, have been susceptible to early failure and/or they have been incapable of fulfilling all of the needs for such a device. For example, their ability to handle elongated elements has often been limited to a relatively short length and, accordingly, the movement of the equipment attached thereto has been correspondingly limited.

While studying the prior art structure, it become apparent that position control over the variable length of flexible element constituted the basic problem. Moreover, the control device had to be capable of adjustment or adaptation to variations in the length, weight, number and type of flexible elements being controlled.

The following descriptive material will be directed primarily to a self-propelled device designed for controlling the position and movement of flexible elements, such as electrical conductors or hollow conduits, because the present invention has developed out of a need for the control of such elements. However, it will be seen, or at least understood, that the self-propelled device of the invention can be used in one of its disclosed forms, or in some adaptation thereof, to serve a variety of purposes wherein a yieldable, unidirectional force is desired.

Accordingly, a primary object of this invention has been the provision of a self-propelled device for engaging and holding under tension an elongated, flexible element connected at its opposite ends to a pair of members, at least one of which is movable with respect to the other.

A further object of this inevntion is the provision of a self-propelled device, as aforesaid, which can be adapted for use with a variety of flexible elements having various shapes, lengths, sizes and weights without departing materially from the basic structure common to all of the devices.

A further object of this invention has been the provision of a device, as aforesaid, which is relatively simple in construction, which can be easily and quickly installed, which is easy and inexpensive to maintain, which can be placed in a relatively small space so that it does not interfere with the normal operation of the equipment with which it is used, and which can, in many instances, be located in regions normally not used for any other purpose.

Other objects and purposes of this invention will become apparent to persons familiar with this type of equipment upon reading the following paragraphs and examining the accompanying drawings, in which:

For the purpose of convenience in description, the terms "upper," "lower" and words of similar import will have reference to the structure embodying the invention as appearing in FIGURES 1, 12, 14 and 18 through 21. The terms "forward," "rearward" and words of similar import will have reference to the right and left ends, respectively, of the structures appearing in FIGURES 1, 12 and 18, for example. Thus, these terms will apply to rightward and leftward movements, respectively, of the carriage which engages and supports the flexible element. The terms "inner," "outer" and words of similar import will have reference to the geometric center of the device embodying the invention and parts associated therewith.

General construction

The objects and purposes of the invention, including those set forth above, have been met by providing a self-propelled device and cooperating structure whereby unidirectional movement of the device can be effected along a predetermined path. In a preferred embodiment, the self-propelled device includes a spring-driven motor supporting a freely rotatable drum which is engageable with an elongated, flexible element having a movable end and a fixed end. The motor is connected to actuating means and engaged by track means whereby said element is continuously held under tension, so that no material amount of slack can occur in the flexible element as the movable end thereof is moved.

Several alternate and/or modified structures are disclosed to indicate some of the various ways in which the concepts of the invention can be given practical application. That is, applicants believe that invention resides not only in a self-propelled device of the particular type disclosed herein, but also the combination of a self-propelled device of this general character and cooperating structure whereby said device is adapted to perform a particular function requiring a yieldable and controllable, unidirectional force.

Detailed description

The apparatus 10 (FIGURES 1, 2, 3 and 4), which has been selected to illustrate an embodiment of the invention, comprises part of an overhead crane having a main carriage 11 which is supported upon a pair of rails 14 and 15, respectively, by wheels 12 and 13 located at its left and right ends, respectively. The carriage 11 includes a plurality of rails 18 upon which the hoist operating motor 19 is supported by the small wheeled vehicle 22 for movement lengthwise of the rails 18, which extend transversely of the rails 14 and 15. The vehicle 22, which has rail-engaging wheels 23, and the carriage 11 may be of conventional types presently found in many industrial and commercial buildings. That is, the wheels 12 and 13 are driven by means not shown to effect movement of the carriage 11 along the rails 14 and 15, and the wheels 23 of the vehicle 22 may be driven by means not shown for the purpose of moving said vehicle along the rails 18. The hoist motor 19 effects vertical adjustment of the hoist 20 (FIGURE 1), and electric power for the hoist motor and for driving the wheels 23 is received through the movable junction box 24 on the bed 26 of the vehicle 22.

Figures 1, 2, 3, 4:
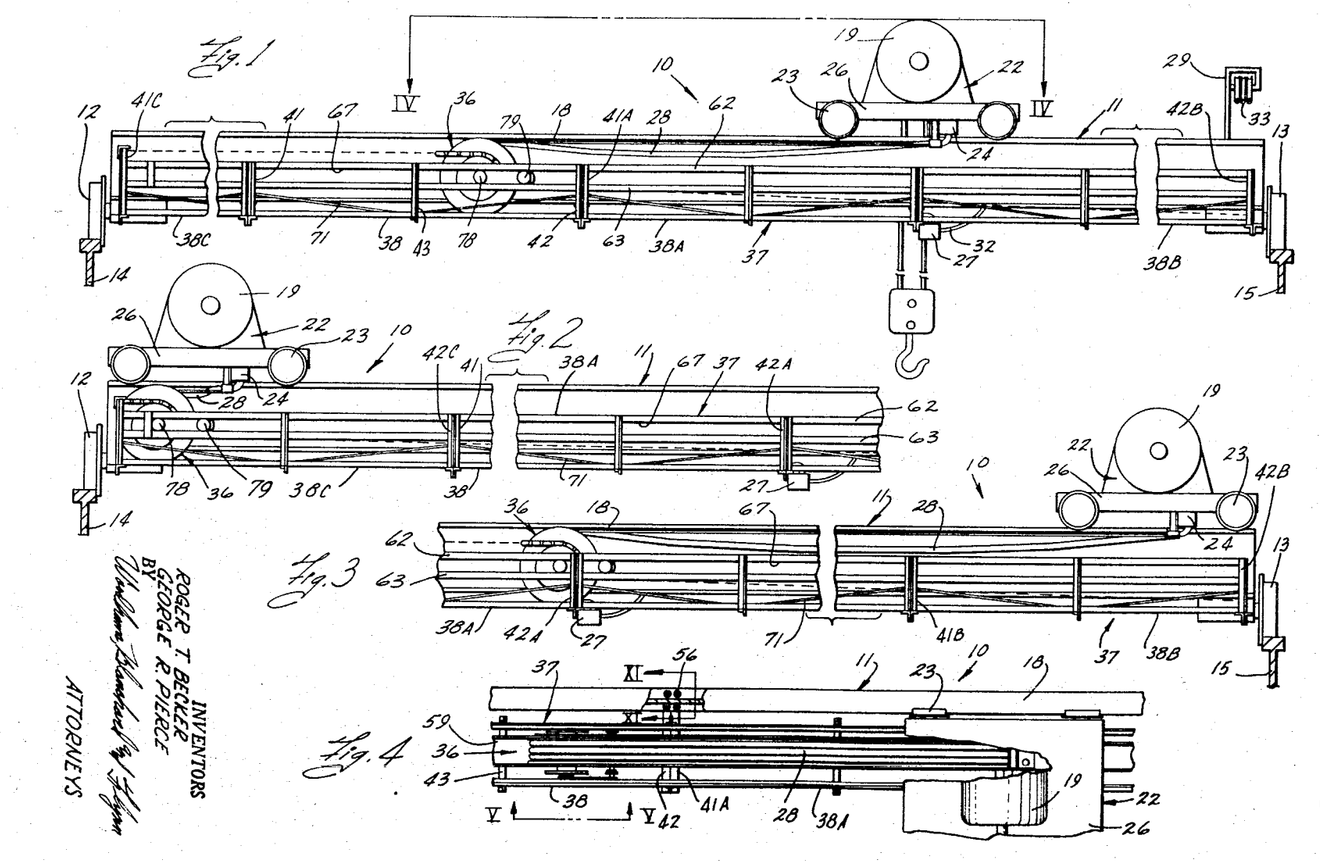
FIGURE 1 is a broken, side elevational view of a structure embodying the invention.
FIGURE 2 is a broken fragment of FIGURE 1 showing parts thereof in different positions of operation.
FIGURE 3 is another broken fragment of FIGURE 1 showing parts thereof in different positions of operation.
FIGURE 4 is a fragmentary top view of the structure shown in FIGURE 1.

A fixed junction box 27 is secured to the carriage 11 and flexible conductor means 28 is connected between the junction boxes 24 and 27. The fixed box 27 may be connected to a source of electrical energy in any conventional manner well known and presently used. For example, the carriage may be equipped with a trolley 29 for electrically connecting a conductor 32 on the carriage 11 to the trolley wires 33. Alternatively, a structure corresponding to the self-propelled device described hereinafter may be utilized to effect this connection.

The self-propelled device 36 (FIGURES 1, 5 and 6) is supported by a track assembly 37 which is mounted upon the carriage 11. In this particular embodiment, the track assembly 37 comprises a plurality of similar track sections 38 (FIGURES 1 and 2), each of which has a pair of substantially U-shaped end brackets 41 and 42 and a U-shaped center bracket 43, which may be substantially similar. That is, the two end brackets and center bracket may be fabricated from three pieces of angle iron which are welded together at their adjoining ends. For example, the end bracket 42 (FIGURE 6) has side elements 45 and 46 and a bottom element 47. Gussets 48 and 49 are welded to the elements 45, 46 and 47 and their junctions for the purpose of strengthening their brackets.

Figure 6:
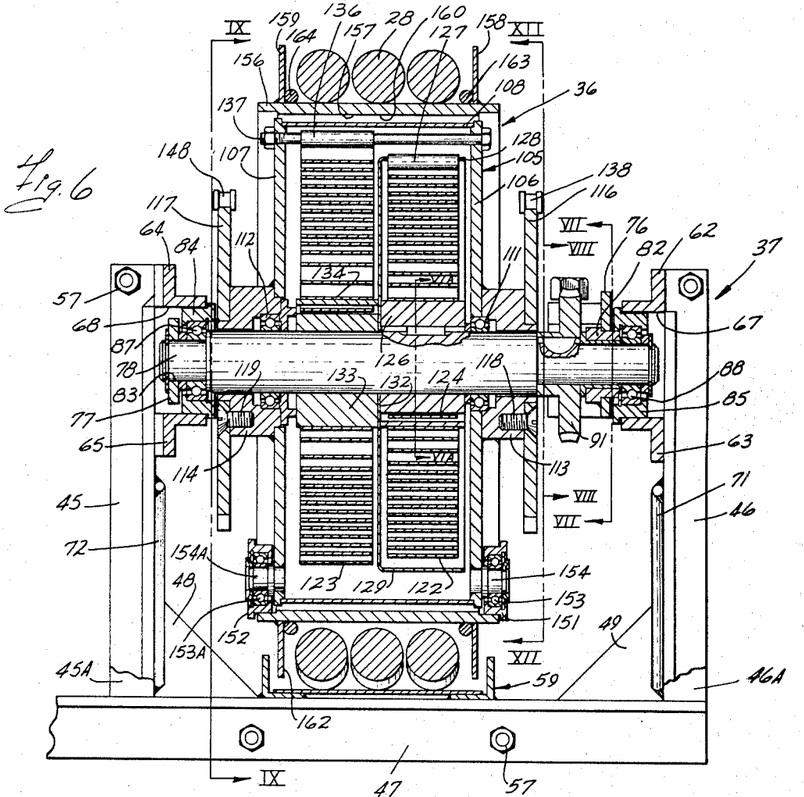
FIGURE 6 is a sectional view taken along the line VI—VI in FIGURE 5.
Figure 11:
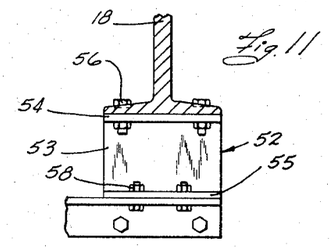
FIGURE 11 is a sectional view taken along the line XI—XI in FIGURE 4.

The bottom elements 47 and 47A of the end brackets 42 and 41, respectively, may project beyond their respective side elements 45 and 45A for the purpose of supporting an I-shaped connecting member 52 (FIGURE 11) having an upright web 53 and transverse flanges 54 and 55, which may be connected to the base of the rail 18 and side elements 45 and 45A, respectively, by means of bolts 56. The end bracket 42 of the track section 38 is connected to the end bracket 41A of section 38A by bolts 57 and to the web 53 by bolts 58. Obviously, welding can be used in place of the aforementioned bolts.

Each track assembly 38 includes an upwardly opening, channel-shaped bed 59 which is secured, as by welding, upon the bottom elements of the brackets 41, 42 and 43, as indicated in FIGURE 6 with respect to the bottom element 47. The purpose of the channel bed 59 will appear hereinafter.

Figure 10:
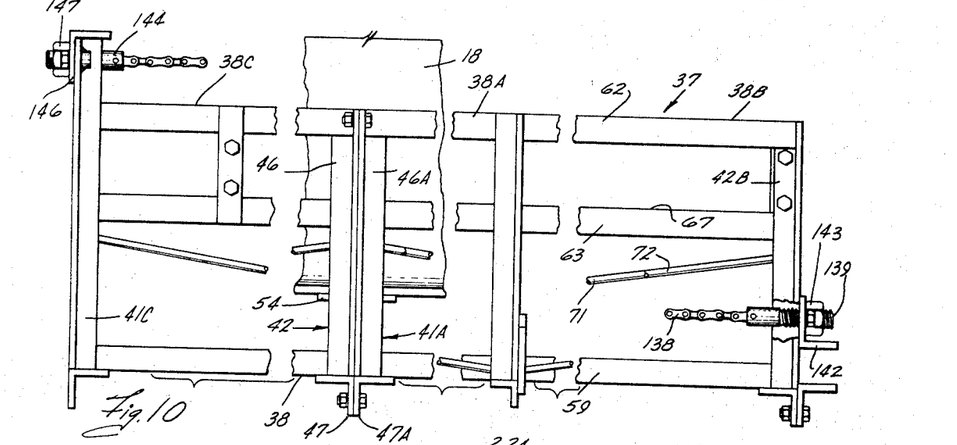
FIGURE 10 is an enlarged, broken fragment of the track structure appearing in FIGURE 1.

Each track section 38 has two pair of spaced side rails 62, 63 and 64, 65, which extend between and are rigidly secured to corresponding side elements of the end brackets 41 and 42. The side rails 62, 63 and 64, 65 extend parallel with the channel bed 59 and they define a pair of guideways 67 and 68 which open toward each other. A pair of tie rods 71 and 72 (FIGURES 6 and 10), which are preferably V-shaped, extend between and are rigidly secured to the side elements of the brackets 41, 42 and 43 below the guideways 67 and 68.

The self-propelled device 36 (FIGURE 6) includes a pair of parallel, spaced side plates 76 and 77 between and through which parallel shafts 78 and 79 (FIGURE 5) extend. The main shaft 78 is rotatably supported within the bearing 82 (FIGURE 6) in the side plate 76 and within the opening 83 in the side plate 77. Wheels 84 and 85 are rotatably supported upon the main shaft 78 near the ends thereof by the bearings 87 and 88 so that the wheels 84 and 85 will be disposed within the guideways 67 and 68, respectively. Said wheels 84 and 85 are flanged to minimize axial movement thereof with respect to side rails 62, 63 and 64, 65, hence with respect to the track assembly 37.

Figures 6A, 7, 8:
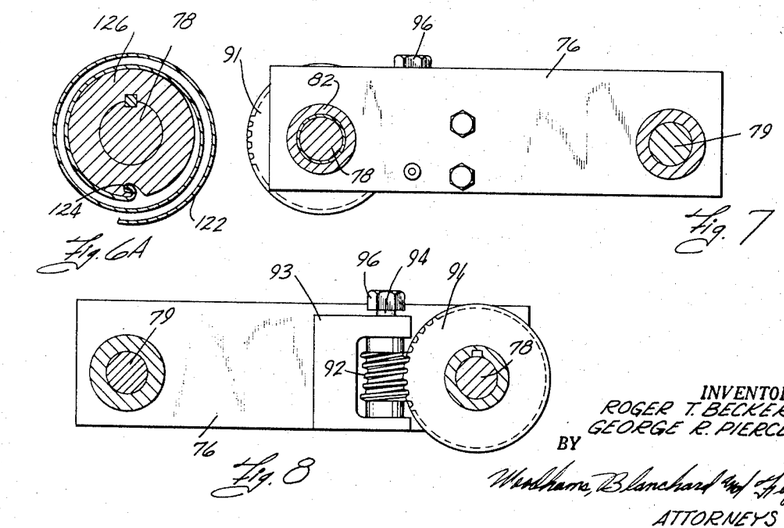
FIGURE 6A is a sectional view taken along the line VIA—VIA in FIGURE 6.
FIGURE 7 is a sectional view taken along the line VII—VII in FIGURE 6.
FIGURE 8 is a sectional view taken long the line VIII—VIII in FIGURE 6.

A helical gear 91 is secured to the main shaft 78 adjacent the bearing 82 and engaged by the helical worm 92 (FIGURE 8) which is rotatably supported upon the side plate 76 by the U-shaped bracket 93. The worm 92 has a shaft extension 94 with an out-of-round head 96 engageable by a wrench or the like for rotating the worm 92 and thereby rotating the helical gear 91, whereby the shaft 78 is rotated and the driving springs 122 and 123 are pretensioned, as discussed hereinafter.

The front shaft 79 (FIGURE 5) is supported upon and between the side plates 76 and 77 to which it may be firmly connected. A pair of flanged guide wheels 97 and 98 (FIGURE 5A) may be rotatably supported upon the front shaft 79 near the opposite ends for reception into the guideways 67 and 68, respectively, whereby the front end of the self-propelled device 36 is supported. A pair of idler sprockets 101 and 102 are rotatably supported upon the shaft 79 for reasons and in locations indicated hereinafter.

The side plates 76 and 77, the shafts 78 and 79 and the wheels 84, 85, 97 and 98 comprise a wheeled frame 103 by means of which the remainder of the self-propelled device 36 is mounted upon and guided along the rails defining the guideways 67 and 68, hence along a path adjacent and substantially parallel with the rail 18 (FIGURE 1 of the carriage 11.

A cylindrical casing 105 (FIGURE 6), which has spaced circular side plates 106 and 107 and a peripheral spacing wall 108, is rotatably supported upon the main shaft 78 by bearings 111 and 112, which are coaxially seated within the hubs 113 and 114 on the side plates 106 and 107, respectively. A pair of drive sprockets 116 and 117 are rigidly secured, as by the screws 118 and 119, respectively, to the hubs 113 and 114 for rotation therewith, hence with the entire cylindrical casing 105. The idler sprockets 101 and 102 (FIGURE 5A) are radially and respectively aligned with the larger drive sprockets 116 and 117.

Figure 5:
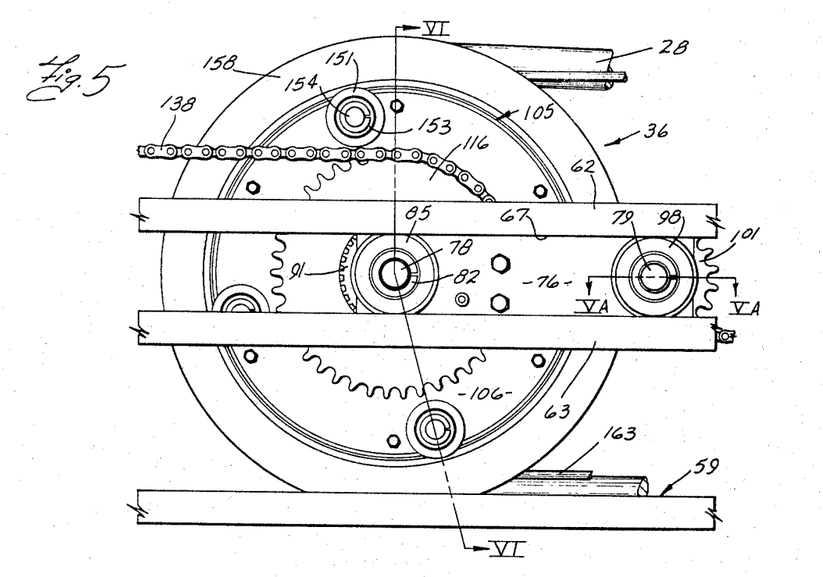
FIGURE 5 is an enlarged, fragmentary side view of the structure shown in FIGURE 4.
Figure 5A:
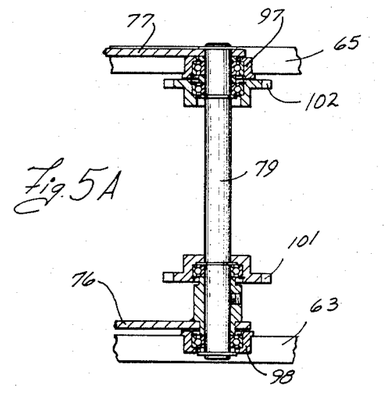
FIGURE 5A is a sectional view taken along the line VA—VA in FIGURE 5.

In this particular embodiment, there are two main spiral springs 122 and 123 (FIGURE 6) disposed within the casing 105 and connected in series between the shaft 78 and the cylindrical casing 105. That is, the inner end 124 of the spring 122 (FIGURE 6A) is releasably connected to a collar 126 firmly mounted upon the shaft 78. The outer end 127 of the spring 122 (FIGURE 6) is releasably connected to the peripheral wall 128 of a sidewardly opening, cup-shaped coupling member 129, the side wall 132 of which is rigidly connected to a collar 133 which is rotatably supported upon the shaft 78. The collar 133 is releasably engaged with the inner end 134 of the spring 123, the outer end 136 of which is connected to a bolt 137 removably extending through the side plates 106 and 107 adjacent the peripheral wall 108. The releasable connections of the inner ends of the springs 122 and 123 are arranged so that rotation of the drive sprocket 116 (FIGURE 5) in a counterclockwise direction effects a tightening of both of the springs 122 and 123 whereby release of the sprocket 116 will cause the tightened springs 122 and 123 to spin the sprocket 116 in a clockwise direction (FIGURE 5).

Portions of the peripheries of the sprockets 101 and 116 are engaged by a chain 138 which passes over the top of the drive sprocket 116 and under the idler sprocket 101. The front end of the chain 138 (FIGURE 10) is connected to a threaded anchor bolt 139 which extends through the crossbar 142 on the end bracket 42B at the front end of the track section 38B. A nut 143 on the anchor bolt 139 is provided to adjust tension on the chain 138. An anchor bolt 144, which may be identical with the anchor bolt 139, extends through the crossbar 146 on the end bracket 41C of the track section 38C near the upper end thereof. A nut 147 is threadedly received on the anchor bolt 144 for adjusting the tension on the chain 138. Accordingly, by means of the anchor bolts 139 and 144, the chain 138 can be held taut at all times.

A chain 148 (FIGURE 6), which may be similar to the chain 138 and connected to the track assembly 37 in a manner similar to that described above with respect to chain 138, is provided on the opposite side of the casing 105 for engagement by the sprockets 102 and 117 (FIGURE 9) for the purpose of assisting chain 138 in the tensioning of the springs 122 and 123 when the self-propelled device 136 is moved frontwardly or rightwardly, as appearing in FIGURE 1, along the track assembly 37.

Figures 9, 12, 15, 16, 17, 21:
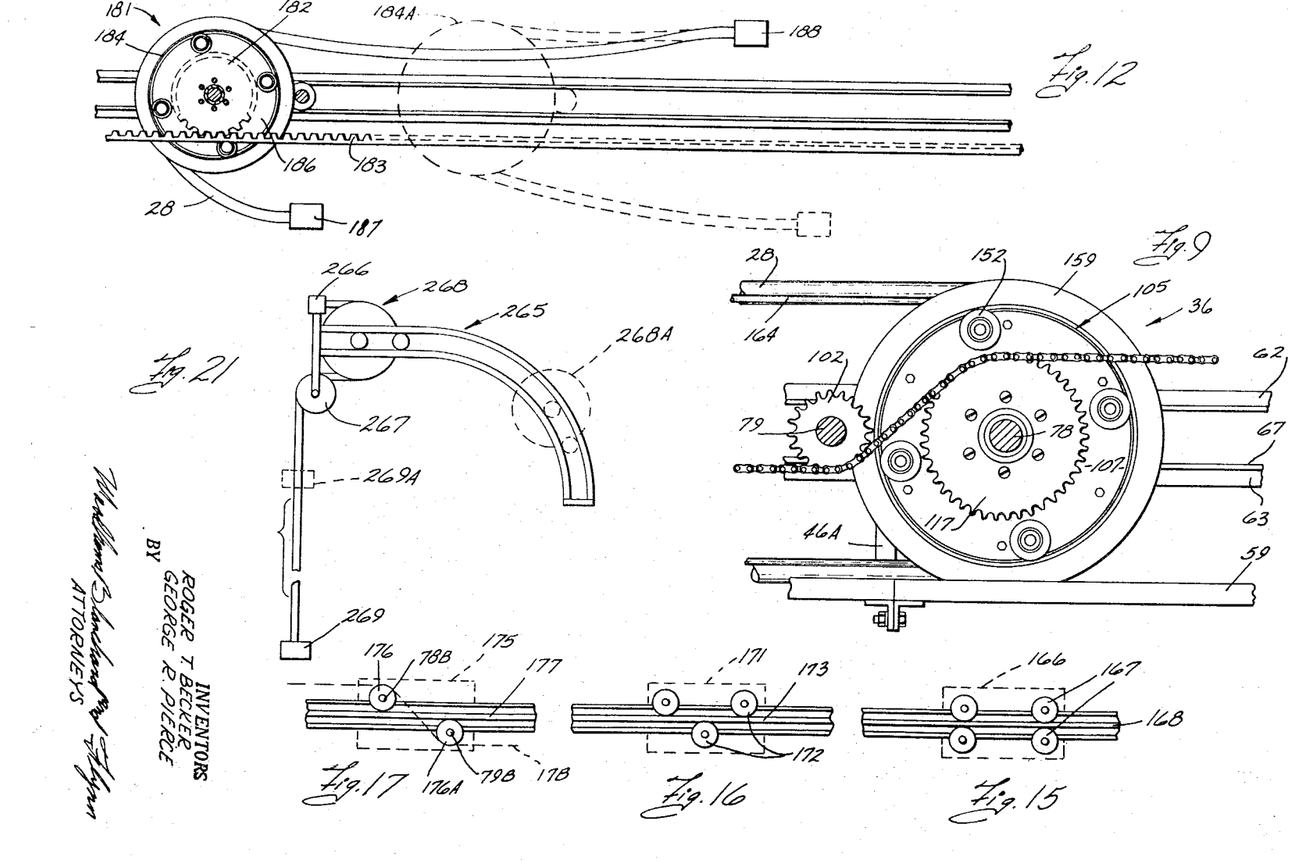
FIGURE 9 is a reduced sectional view taken along the line IX—IX in FIGURE 6.
FIGURE 12 is a sectional view substantially as taken along the line XII—XII in FIGURE 6 and showing an alternate construction.
FIGURE 15 is an enlarged fragment of FIGURE 1 showing an alternate guide arrangement.
FIGURE 16 is a fragment similar to that shown in FIGURE 15 and illustrating another guide arrangement.
FIGURE 17 is a fragment similar to that appearing in FIGURE 15 and showing a further guide arrangement.
FIGURE 21 is a side elevational view of a device embodying a further form of the invention.

The side plates 106 and 107 of the cylindrical casing 105 (FIGURE 6) rotatably support a plurality of rollers 151 and 152, respectively, adjacent the peripheral edges thereof. In this embodiment, and as shown in FIGURES 5 and 9, there are four such rollers uniformly spaced around each side plate and the rollers on one side plate are preferably substantially coaxial with the rollers on the other side plate. Each roller 151 is rotatably supported by a bearing 153 upon a stub shaft 154 which is in turn rigidly secured to the side plate 106. The rollers 152 are mounted by means of bearings 153A upon stub shafts 154A, which are secured to the side plate 107. The peripheral surface of each of the rollers 151 and 152 preferably extends the same, relatively small distance beyond the outer surface of the peripheral wall 108 for engaging the inner surface 157 of, and rotatably supporting, the cylindrical drum 156 adjacent the opposite axial edges thereof. The inner surface 157 of the drum 156 has a central portion 160 of reduced diameter which projects radially inwardly between and close to the rollers 151 and 152 whereby axial movement of the drum with respect to the cylindrical casing 105 is positively opposed.

The drum 156 includes a pair of spaced and parallel flanges 158 and 159 which are rigidly secured to and project radially outwardly from the drum 156 for the purpose of providing an annular trough 162 in which one or more conductors 28 are disposed and held. It will be seen that the drum 156, being rotatably supported upon the rollers 151 and 152, is free floating.

In order to minimize or control the tension imposed by the self-propelled device 36 upon relatively weak conductors 28 or hollow conduits during normal operation, one or more, here two, control cables 163 and 164 (FIGURE 6) are arranged beside the conductors and extend around the cylindrical drum 156 preferably within the trough 162. As shown in FIGURE 1 with respect to cable 163, one end of each cable is attached to the carriage 11 adjacent the fixed box 27, and the other end of each cable is connected to the vehicle 22 adjacent the movable box 24. Preferably, the cables 163 and 164 are slightly shorter than the conductors 28 so that at least the major portion of the tension is borne by said cables which are preferably made from steel wire.

*Operation*

After the structure including the track assembly 37 and the self-propelled device has been assembled as shown in FIGURES 1 and 4, the control cables 163 and 164, where used, are then properly tensioned. The device 36 is arranged so that the tension in the springs 122 and 123 (FIGURE 6) operates through the cylindrical casing 105, the sprockets 116 and 117 and the chains 138 and 148 to urge the self-propelled device 36 leftwardly (FIGURE 1), whereby tension is maintained upon the control cables 163 and 164, hence the conductors 28. Thus, with the vehicle 22 in its leftwardmost position of FIGURE 2, the tension on the spiral springs 122 and 123 (FIGURE 6) is at its minimum. If this tension is not sufficient, it can be increased by appropriate rotation of the helical worm 92.

As the vehicle 22 is moved rightwardly from its FIGURE 2 position toward its FIGURE 3 position, the drive sprockets 116 and 117 (FIGURE 6) are rotated in a counterclockwise direction, as appearing in FIGURE 5, which gradually increases the tension upon the springs 122 and 123. Accordingly, when the self-propelled device 36 reaches it fully rightward position of FIGURE 3 wherein the largest part of the conductor 28 is suspended between the self-propelled device 36 and the vehicle 22, the greatest amount of tension is applied to the springs 122 and 123. Moreover, return leftward movement of the self-propelled device 36, whereby the conductors 28 are continuously held in their suspended positions, is assured. When the vehicle 22 is in its fully leftward position, the biggest part of each conductor is resting within the channel bed 59.

The extent to which the capacity of the self-propelled device 39 can be increased to accommodate longer conductors is limited only by the number of spiral springs 122 and 123 which can be satisfactorily placed in series with each other according to the teachings of the prior art of series connected spiral springs. Thus, it is fully contemplated that four, five or more spiral springs can be placed in series to increase the length of cable which the self-propelled device can handle to carry out the purposes of the invention.

While electrical conductors have been specifically mentioned herein to illustrate the invention, it will be recognized that the invention can be used just as effectively with hollow conduits for liquids or any other elongated element wherein it is desirable to move one end of the element with respect to the other while preventing tangling, snarling, crimping or pinching of the elongated element during, before or after such movement.

*Modified structure*

In the principal embodiment of the invention appearing in FIGURES 5 and 6, each track assembly includes side rails which provide a pair of spaced and parallel guideways 67 and 68 into which the wheels 84, 85, 97 and 98 are received to hold the self-propelled device 36 in a constant attitude as it moves along said guideways. However, as shown in FIGURES 15, 16 and 17, a variety of different wheel and rail arrangements can be utilized to perform the same function. For example, the self-propelled device indicated in broken lines at 166 in FIGURE 15 is provided with four wheels 167 on at least one side thereof. Two of the wheels 167 are engageable with the upper side of the single guide rail 168, and the other two wheels engage the lower side of the rail 168 whereby the device 166 is maintained in a constant attitude as it moves along said rail 168.

In FIGURE 16, the self-propelled device 171 has three wheels 172 mounted on at least one side thereof with two of said wheels spaced from each other and engaged with the upper surface of the rail 173. The third wheel is located below the rail midway between the two upper wheels. Again, this combination of wheels and rails maintains the constant attitude of the device as it moves lengthwise of the rail 173.

In FIGURE 17, the self-propelled device 175 has on at least one side thereof one wheel 176 above the rail 177 and one wheel 176A below said rail. However, the wheels are horizontally offset so that said desired constant attitude is maintained. More specifically, the wheel 176A, which is connected to the idler shaft 79B, is below the rail and the wheel 176, which is attached to the main shaft 78B, is above the rail. Thus, with the chain 178 (FIGURE 17) extending over the main shaft 78B and below the idler shaft 79B, the turning moment created by the spring tension would be counterclockwise which, therefore, would be effectively opposed by the disclosed arrangement of the two wheels 176 and 176A.

The self-propelled device 181 (FIGURE 12) may be substantially identical with the self-propelled device 36 except that chains 138 and 148 and the sprockets 101, 102, 116 and 117 of the self-propelled device 36 are replaced by a pair of gears 182 (FIGURE 12) and cooperating racks 183. Since the rack 183 is inherently rigid, the idler sprockets used in the self-propelled device 36 become unnecessary. As the drum 184 moves from its solid line position in FIGURE 12 to its broken line position 184A, the gear 182 is rotated in a clockwise direction, in this particular embodiment, whereby the spiral springs, not shown, within the reel casing 186 are tightened. Thus, the self-propelled device 181 constantly urges the movable junction box 187 leftwardly with respect to the fixed box 188, in substantially the same manner as discussed above with respect to the apparatus shown in FIGURE 1.

Figures 13, 14:
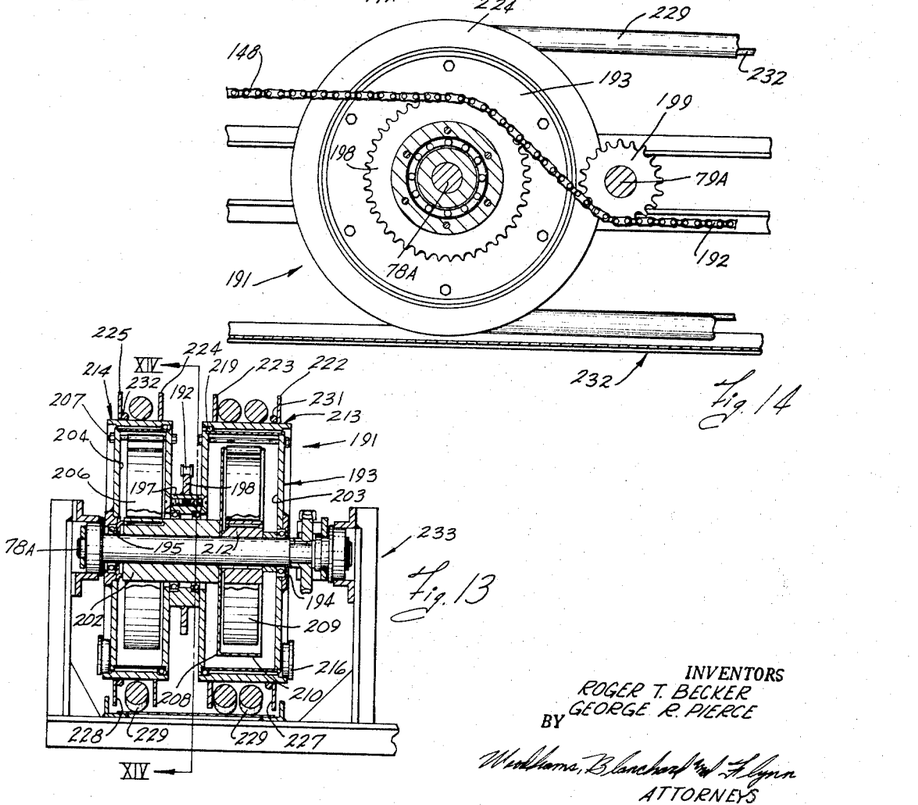
FIGURE 13 is a sectional view similar to that appearing in FIGURE 6 and illustrating a modified structure.
FIGURE 14 is a sectional view taken along the line XIV—XIV in FIGURE 13.

FIGURES 13 and 14 illustrate an alternate, self-propelled device 191 which differs from the self-propelled device 36 in one principal respect. That is, the device 191 utilizes a single chain 192 in place of the two chains 138 and 148 (FIGURE 6) disclosed with the self-propelled device 36.

More specifically, the device 191 (FIGURE 14) includes a main shaft 78A and front or idler shaft 79A which may be substantially identical with the corresponding shafts in the device 36. A cylindrical casing 193 (FIGURE 13) is rotatably supported upon the main shaft 78A by bearings 194 and 195, and said casing has a central portion 197 of reduced diameter upon which the drive sprocket 198 is rigidly secured for engagement with the chain 192. An idler sprocket 199 is mounted upon the front shaft 79A (FIGURE 14) in radial alignment with the drive sprocket 198 for engaging the chain 192 whereby contact of the chain with the drive sprocket 198 is effected over a wider arc to insure a better grip therebetween.

A sleeve 202 is rotatably supported upon the main shaft 78A within the casing 193 so that said sleeve extends from within the spring chamber 203 on one side of the drive sprocket 198 to the spring chamber 204 on the other side of the drive sprocket. The outer end of a spiral spring 206 which is disposed within the chamber 204, is secured to the casing 193 by means of the bolt 207. The inner end of the spring 206 is releasably connected to the sleeve 202 within the spring chamber 204. A cup-shaped coupling 208 is secured to the sleeve 202 within the spring chamber 203 and houses a spiral spring 209. The outer end of the spring 209 is secured to the radial wall 210 of the coupling 208, and the inner end of the spring 209 is releasably connected to a collar 212, which is in turn keyed to the main shaft 78A. The spiral springs 206 and 209 are in series connection so that rotation of the drive sprocket 198 in a counterclockwise direction, as appearing in FIGURE 14, will effect a tightening of said springs 206 and 209. However, excessive rotation of the drive sprocket 198 in the clockwise direction will disengage said springs from the sleeve 202 and/or the collar 212.

Because of the split in the casing 193, there are two drums 213 and 214 supported upon said casing for free-floating rotation with respect thereto around the axis of the main shaft 78A. The drum 213 is supported by rollers 216, which may be identical with the rollers 151 or 152 (FIGURE 6), and by bearings 217 on the righthand portion of said casing. In a similar manner, the drum 214 is supported upon the leftward side of the casing 193 by means of rollers 218 and bearings 219. The drums 213 and 214 have pairs of spaced, radially outwardly extending and substantially parallel flanges 222, 223, 224 and 225, which define annular troughs 227 and 228 for the conductors 229. Tension cables 231 and 232 are provided for substantially the same purposes as the control cables 163 and 164 (FIGURE 6).

The track assembly 233 may be substantially identical with the track assembly 237 except that said track assembly 233 may be slightly wider to accommodate the split casing arrangement of the self-propelled device 191. The performance and operation of the self-propelled device 191 is substantially identical with the performance and operation of the self-propelled device 36.

Figures 18, 20, 25:
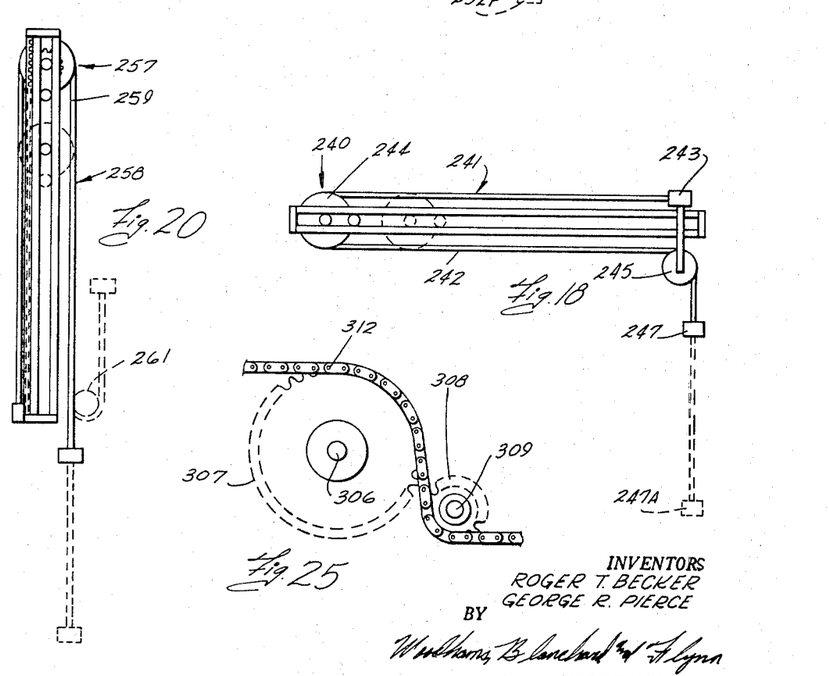
FIGURE 18 is a side elevational view of a modified device embodying the invention.
FIGURE 20 is a side elevational view of a device embodying an alternate form of the invention.
FIGURE 25 is a sectional view taken along the line XXV—XXV in FIGURE 23.

FIGURES 18, 19, 20 and 21 illustrate further track and conductor arrangements with which the invention might be used. FIGURE 18 illustrates a self-propelled device 240 supported upon a horizontal track assembly 241 for movement lengthwise thereof. A conductor 242 is connected to the fixed box 243 and, after passing around the drum 244 passes over a pulley 245 and extends downwardly where it is connected to a movable junction box 247. As the junction box 247 moves downwardly toward its broken line position 247A, the springs in the device 240, which may be identical with the self-propelled device 36, are tightened. Said springs can be adjusted to urge the movable junction box upwardly towards its solid line position, or they can be adjusted so that the device acts like a balance reel. That is, the spring is carefully adjusted so that its increased tension only compensates for the additional amount of conductor 242 which depends from the pulley 245, as the movable box 247 is moved downwardly towards its broken line position.

Figure 19:
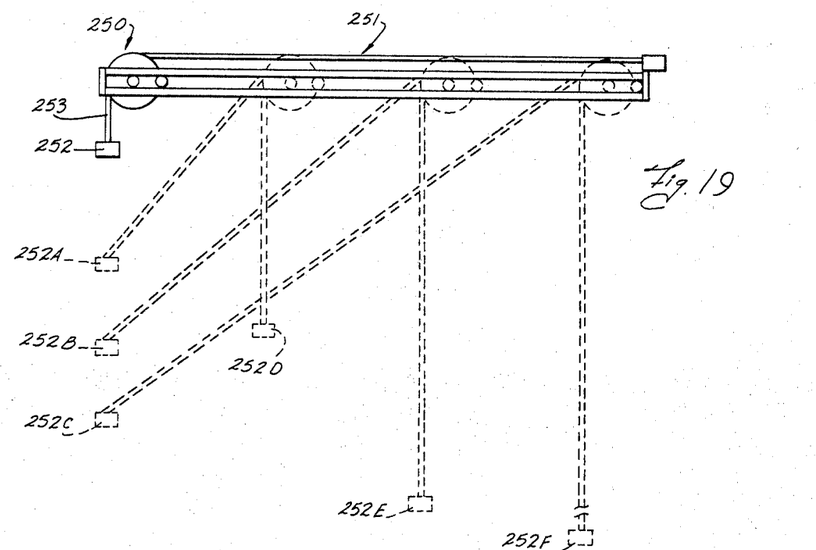
FIGURE 19 is a side elevational view of another modified device embodying the invention.

FIGURE 19 illustrates a self-propelled device 250 mounted on a horizontal track assembly 251 wherein the self-propelled device 250 may be substantially identical with the device 36 (FIGURE 6). As the movable junction box 252, or other weight, is moved downwardly through the positions 252A, 252B, and 252C, the spring tension in the self-propelled device 250 is increased, thereby urging the return, leftward movement of the device 250. In another use of the same structure, the movable junction box moves both horizontally and vertically through the positions 252D, 252E and 252F in response to rightward movement of the device 250. The spring tension in the self-propelled device 250 may be arranged either to merely compensate for the additional weight of conductor 253, which depends from the device 250, or said tension may be in excess of the amount required to overcome this additional weight and continuously urge the upward and leftward movement of the movable junction box towards its solid line position.

In FIGURE 20, the self-propelled device 257 is supported upon a vertical track assembly 258 so that the tension of the springs therein urges continuous upward movement of the device towards its solid line position. In this particular embodiment, the rack and gear structure of FIGURE 12, described above, is utilized. The arrangement of FIGURE 20 enhances the use of the invention in place of a balance reel structure in that the proportionality between additional weight of the conductor 259, particularly where the conductor's weight is a relatively small amount, can be cancelled out by the effect of gravity upon the upward urging of the self-propelled device.

It will be recognized that the structure of FIGURE 20 can be inverted to increase its effectiveness where a strong upward movement of the junction box should be opposed. Likewise, this same effect can be produced by using a pulley where indicated by broken lines at 261 in FIGURE 20.

In the structure of FIGURE 21, the track assembly 265 is generally similar to the track assembly of FIGURE 18 except that the end of the track assembly 265 remote from the fixed box 266 and pulley 267 curves downwardly. This arrangement permits more effective use of the self-propelled device 268 as a balance mechanism in that gravity augments spring tension where such tension is the weakest, as shown in broken lines at 268A. That is, with a self-propelled device such as the one shown at 36 in FIGURE 6, the spring tension would be near its weakest value when the movable junction box 269 is in its broken line position, but the effect of gravity upon the device 268 would be near its largest value.

Figure 22:
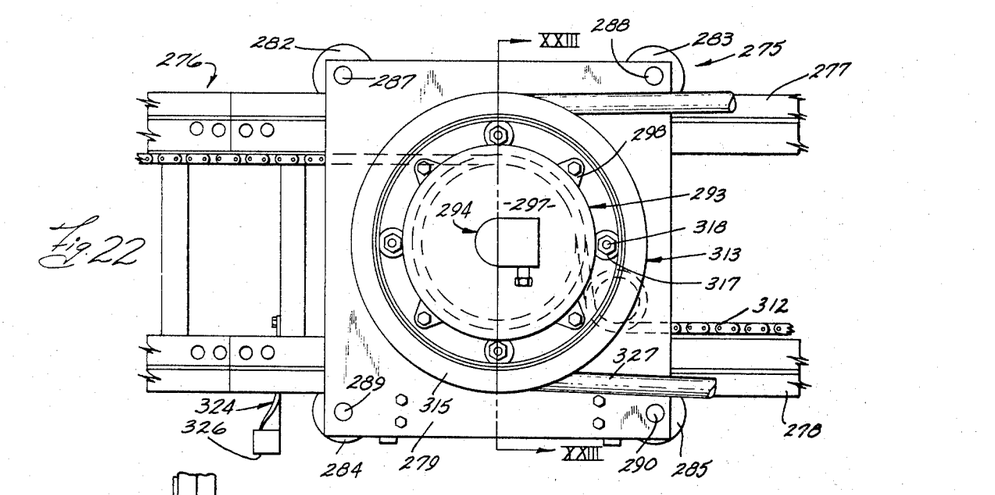
FIGURE 22 is a fragmentary, side elevational view of an apparatus including a modified, self-propelled device mounted upon a modified track assembly and embodying the invention.
Figure 23:
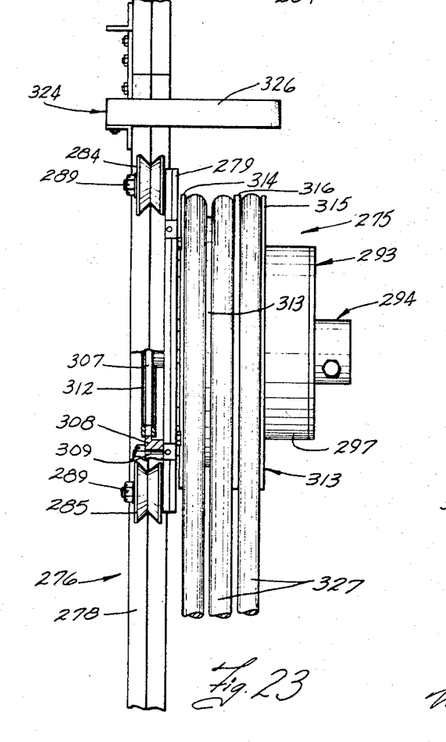
FIGURE 23 is a sectional view taken along the line XXIII—XXIII in FIGURE 22.

The modified, self-propelled device 275 of FIGURES 22 and 23 is supported substantially entirely on one side of a track assembly 276 which is comprised of two vertically spaced rails 277 and 278, which are V-shaped in this embodiment. The track assembly 276 is preferably made in sections which can be interconnected to provide a track of substantially any desired length.

Figure 24:
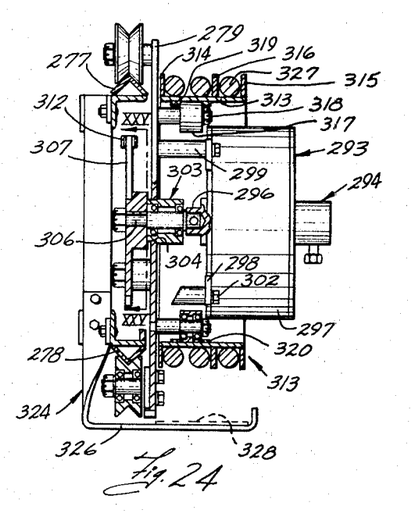
FIGURE 24 is a bottom view of the apparatus appearing in FIGURE 22.

The device 275 is comprised of a side plate 279 (FIGURES 23 and 24) which is normally vertical and preferably closely adjacent the track assembly. The side plate 279 may be approximately rectangular in shape and has four rollers 282, 283, 284 and 285 which are preferably identical and V-grooved in this embodiment. The upper rollers 282 and 283, which are mounted upon the stub shafts 287 and 288, respectively, engage the upper surface of the upper rail 277. The two lower rollers 284 and 285, which are mounted upon the stub shafts 289 and 290, respectively, engage the lower sides of the lower rail 278. This arrangement of the rails 277 and 278 with the rollers 282, 283, 284 and 285 permits movement of the side plate 279 lengthwise along the track assembly 276, but positively prevents sideward or lateral disengagement of the rollers from the track assembly intermediate its ends. The two lower stop shafts 289 and 290 are adjustably mounted, at least in a vertical direction, upon the plate 279 so that the rollers can be adjusted for snug rolling engagement with the track assembly.

The device 275 includes a spring motor 293 of a conventional type (FIGURE 24) having a spring tension adjustment 294, a drive shaft 296 and a housing 297 with four mounting lugs 298 (FIGURE 22) thereon. A plurality, here four, of mounting posts 299 (FIGURE 23) are rigidly secured to the side plate 279 and extend therefrom toward said lugs 298. Said posts 299 have threaded openings for engagement by screws 302 which are received through appropriate openings in the mounting lugs 298.

A bearing assembly 303 (FIGURE 23) is rigidly mounted adjacent an opening 304 in the side plate 279 in axial alignment with the drive shaft 296. A driven shaft 306 is rotatably supported within the bearing assembly 303 and is releasably engageable at one end thereof with said drive shaft 296. A large sprocket 307 is concentrically secured upon the driven shaft 306, and it is preferably disposed directly between the rails 277 and 278 when the rollers are engaging same. A small idler sprocket 308 is rotatably supported by the shaft 309 upon the side plate 279 so that it is radially aligned with and near the lower side of the large sprocket 307. A chain 312, which is anchored at both ends upon the track assembly 276 in much the same manner as discussed above with respect to the chain 138 (FIGURE 10), extends over the top of the large sprocket 307, then downwardly between the large and small sprockets and finally under the small idler sprocket 308.

A cylindrical drum 313 (FIGURE 23), which has two annular flanges 314 and 315, is rotatably supported upon a plurality, here four, of rollers 317 which are in turn rotatably supported by antifriction bearing means upon the shafts 318 which are rigidly secured to the side plate 279 at uniformly spaced intervals. A pair of spaced, annular guide tracks 319 and 320 are rigidly secured to the inner surface of the drum 313, and the rollers 317 are disposed snugly therebetween to prevent accidental disengagement of the drum 313 from its support upon said rollers.

A plurality of L-shaped brackets 324 are mounted upon and extend substantially transversely of the rails 277 and 278 so that the lower horizontal leg 326 of each extends under and is spaced downwardly from the device 275 as it moves along the track assembly 276. Thus, the lower reaches of the conduits 327 can be supported upon said horizontal legs 326. In some instances, it may be advantageous to provide a plate 328 upon and between the legs 326 to provide continuous support for the conduits 327.

The modified device 275 operates in substantially the same general manner as the device 36, for example. That is, the spring motor 293, acting through the shaft 306, the sprocket 307 and the chain 312, continuously urges the device 275 along the track assembly 276 in a direction which maintains tension on the conduits 327. Under normal circumstances, the lower reaches of the conduits 327 will be attached to the fixed junction box and the upper reaches thereof will be attached to the moving mechanism such as the chain hoist described hereinabove with respect to the apparatus 10. Accordingly, and intentionally, the spring motor 293 is arranged so that its tension increases as the length of the upper reaches of the conduits 327 increase, thereby providing the additional strength required to counteract the effects of gravity upon the upper reaches of the conduit. It will be apparent that this arrangement applies a racking force upon the connection between the device and the track assembly. However, by providing adequate spacing between the rollers 282, 283, 284 and 285, no adverse effects are produced. It will be apparent that the drum 313 is freely rotatable with respect to the plate 279 so that said drum can rotate as required to accommodate the movement of the conduit 327.

An important feature of this invention is the yieldable, unidirectional character of the force urging the self-propelled device along the track. The spring motor has been found to be an excellent means of providing such force. However, other means, such as an electric torque motor, a hydraulic motor or an air motor could, for example, be used in place of the spring motor. Moreover, the energy supply lines required by these motors can be connected to a fixed source and carried on the same drum which engages the flexible elements, or on an auxiliary drum.

The drum 313 (FIGURE 23) may have annular partitions 316 between the flanges 314 and 315 to control the positions of several conduits 321 or to isolate them, for example.

Although particular preferred embodiments of the invention have been disclosed hereinabove for illustrative purposes, it will certainly be evident that other variations or modifications of such disclosure can be provided and any such variations or modifications which come within the scope of the appended claims, are fully contemplated.

The embodiments of the invention in which an exclusive property or privilege is claimed are defined as follows:

1. A mechanism for maintaining tension on an element having one portion connected to movable means movable along a path, comprising:
   carriage means mounted adjacent said path for movement therealong;
   rotary means mounted upon said carriage means for rotation with respect to said carriage means;
   actuating means connected to said rotary means and cooperating means arranged along said path for effecting rotation of said rotary means as said carriage means is moved along said path;
   torque means connected between said carriage means and said rotary means yieldably opposing rotation of said rotary means in one rotational direction and urging rotation of said rotary means in the other rotational direction, the sense of such urging being such that said carriage means is urged along said path away from said movable means; and
   means supported upon said carriage means and engaged by a part of said element spaced from said portion for tensioning said element.

2. A self-propelled mechanism for maintaining tension on a length of flexible element connected at one end to fixed means and at the other end to movable means movable along a path and with respect to said fixed means, comprising:
   elongated track means extending lengthwise along the path of said movable means and near said fixed means;
   carriage means supported upon said track means for movement lengthwise thereof toward and away from said fixed means;
   rotary means mounted upon said carriage means for rotation around an axis substantially perpendicular of the lengthwise extent to said track means;
   actuating means operably connected to said rotary means for rotation therewith;
   elongated drive means extending lengthwise along and held with respect to at least the portion of said track means traversed by said carriage means, said drive means being engaged by said actuating means for effecting movement of said carriage means along said track means in response to rotation of said rotary means;
   torque means connected between said carriage means and said rotary means for opposing rotation of said rotary means in one rotational direction, whereby said carriage means is moved toward said fixed means, and for urging rotation of said rotary means in the other rotational direction, whereby said carriage means is moved away from said fixed means; and
   drum means and means supporting said drum means upon said carriage means for rotation around an axis transverse of said track means, said flexible element being looped around said drum means so that said length of element is substantially tensioned.

3. A mechanism according to claim 2, wherein said drive means comprises a flexible chain connected at its opposite ends to said track means, and said actuating means is a gear coaxially mounted upon said rotary means and engaged with said chain.

4. A mechanism according to claim 2, wherein said drive means is a rack and said actuating means is a gear;
   wherein said track means includes a pair of substantially parallel, rigid elements on both sides of said carriage means; and
   including a pair of roller means mounted on each side of said carriage means and snugly but rotatably disposed between each pair of said rigid elements, said roller means being arranged to prevent rotation of said carriage means around said perpendicular axis in response to urging of said torque means.

5. A mechanism according to claim 2, wherein said path is disposed at an angle to the horizontal and said carriage means is urged upwardly away from said fixed means.

6. A mechanism according to claim 2, wherein said path is substantially horizontal; and
   including pulley means disposed near and below said fixed means, the portion of said flexible element between said movable means and said drum means extending at least partially around and being supported at least partially by said pulley means.

7. A mechanism according to claim 6, wherein said track means includes a horizontal portion adjacent said fixed means and a downwardly curved portion spaced from said fixed means, the amount of such curvature being governed by the weight of said movable means and the strength of said torque means, whereby said movable means tends to remain in a balanced position when the carriage means is located at substantially any point along said track means.

8. A mechanism according to claim 2, wherein said carriage means includes shaft means rotatably supporting said rotary means;
   wherein said torque means includes substantially spiral spring means and coupling means connecting said spring means between said rotary means and said shaft means; and
   adjustment means connected between said shaft means and said carriage means for effecting rotation of said shaft means with respect to said carriage means.

9. A mechanism according to claim 2, wherein said carriage means includes shaft means rotatably supporting said rotary means; and
   wherein said rotary means includes annular bearing means supported thereon near the periphery thereof for rotation around axes parallel with said axis of said rotary means, said bearing means being engaged with said drum means and rotatably supporting same coaxially upon said rotary means.

10. A mechanism according to claim 2, wherein said track means includes support means extending along said path and beneath the flexible element for supporting the portion thereof extending between said drum means and said fixed means.

11. A mechanism according to claim 2, wherein said rotary means has a central portion of reduced diameter and said actuating means encircles said reduced portion; and wherein said drum means includes a pair of coaxial, cylindrical members, one member being rotatably supported upon said rotary means on each side of said reduced portion.

12. A mechanism according to claim 2, wherein said track means includes substantially parallel, spaced and rigid rail means disposed on opposite sides of said carriage means; and including roller means mounted on said opposite sides of said carriage means for rotation around axes substantially perpendicular to said track means, said roller means being in engagement with said rail means and arranged to prevent rotation of said carriage means around said perpendicular axis in response to urging of said torque means.

13. A mechanism according to claim 2, wherein said track means includes substantially parallel, rigid and spaced rail means substantially disposed upon one side of said carriage means; and including spaced roller means rotatably supported upon said one side of said carriage means for rotation around parallel axes, said roller means being snugly and rollably engageable with the remote side of said rail means, said roller means and said rail means having interfitting structure for positively opposing axial movement of said roller means with respect to said rail means.

14. A mechanism according to claim 2, wherein said carriage means includes a substantially vertical side plate on one side thereof and adjacent said track means; and wherein said drum means is rotatably supported by said side plate on the opposite side thereof from said track means.

15. A mechanism according to claim 2, wherein said track means comprises substantially parallel, rigid and vertically spaced rail means;

wherein said carriage means has a substantially vertical side plate adjacent said rail means;

wherein said actuating means and said elongated engaging means are substantially disposed between said rail means; and including roller means mounted upon said side plate and engageable with said rail means for supporting said carriage means thereon.

16. A mechanism according to claim 2, wherein said drum means has spaced annular flange means on the periphery thereof defining a plurality of annular channels in each of which at least one flexible element can be disposed.

17. A mechanism movable along a path for producing a yieldable force, comprising:

carriage means mounted adjacent said path for movement therealong;

rotary means mounted upon said carriage means for rotation with respect to said carriage means around an axis transverse of said path;

actuating means connected to said rotary means and having a first drive means thereon;

elongated drive means drivingly engaged with said first drive means for effecting rotation of said rotary means as said carriage means is moved along said path, said elongated drive means continuously extending along the portion of said path along which said carriage means travels; and torque means connected between said carriage means and said rotary means yieldably opposing rotation of said rotary means in one rotational direction and urging rotation of said rotary means in the other rotational direction, whereby said carriage means is urged in one direction along said path.

18. A mechanism according to claim 17, including:

secondary rotary means rotatably supported upon said carriage means; and flexible element means engaged by said secondary rotary means and urged along said path in said one direction.

19. A self-propelled mechanism for maintaining tension on a length of flexible element connected at one end to fixed means and at the other end to movable means movable along a path and with respect to said fixed means, comprising:

elongated track means extending lengthwise along the path of said movable means and near said fixed means;

carriage means supported upon said track means for movement lengthwise thereof toward and away from said fixed means;

rotary means mounted upon said carriage means for rotation around an axis substantially perpendicular to the lengthwise extent of said track means;

actuating means connected to said rotary means and including elongated drive means arranged along a portion of said track means for effecting rotation of said rotary means in response to movement of said carriage means along said track means;

torque means connected between said carriage means and said rotary means for opposing rotation of said rotary means in one rotational direction, whereby said carriage means is moved toward said fixed means, and for urging rotation of said rotary means in the other rotational direction, whereby said carriage means is moved away from said fixed means; and drum means and means supporting said drum means upon said carriage means for rotation around an axis transverse of said track means, said flexible element extending at least partially around said drum means so that said length of element is substantially tensioned.

20. A mechanism for maintaining tension on an element having one portion connected to movable means movable along a path, comprising:

carriage means mounted adjacent said path for movement therealong;

rotary means mounted upon said carriage means for rotation with respect to said carriage means;

actuating means connected to said rotary means and means cooperating therewith stationary in the direction of movement of said carriage means for effecting rotation of said rotary means as said carriage means is moved along said path;

torque means connected between said carriage means and said rotary means yieldably opposing rotation of said rotary means in one rotational direction and urging rotation of said rotary means in the other rotational direction, the sense of such urging being such that said carriage means is urged along said path away from said movable means; and means supported upon said carriage means and engaged by a part of said element spaced from said portion for tensioning said element.

21. Apparatus for maintaining tension on a length of flexible element having one end fixed and the other end movable along a defined path, comprising:

(I) elongated track means extending lengthwise in the direction of the path of the movable end of said flexible element, (II) a self-propelled mechanism comprising:

(A) a carriage supported on and arranged for traveling along said elongated track means, (B) a spring motor mounted on said carriage comprising a frame affixed to said carriage, a shaft rotatively mounted in said frame connected to one end of said spring, means operatively connecting said shaft to said frame in any one of a plurality of fixed rotative positions, and a sprocket rotatively mounted on said frame and operatively connected to the other end of said spring, (C) a flexible chain fixed at its ends with respect to said track means and engaging the teeth of said sprocket, said spring motor being so wound as to cause said sprocket to travel along said chain and to move said carriage in a direction away from the fixed end of said flexible element, and (D) pulley means rotatively mounted on said carriage and engaging said flexible element.

22. Apparatus for maintaining tension on a length of flexible element having one end fixed and the other end movable along a defined path, comprising:

(I) elongated track means extending lengthwise in the direction of the path of the movable end of said flexible element, (II) a self-propelled mechanism comprising:
(A) a carriage supported on and arranged for traveling along said elongated track means,
(B) a spring motor mounted on said carriage comprising a frame affixed to said carriage, a shaft rotatively mounted in said frame connected to one end of said spring, adjustable means operatively connecting said shaft to said frame in any one of a plurality of fixed rotative positions, and a pinion gear rotatively mounted on said frame and operatively connected to the other end of said spring, (C) a rack fixed with respect to said track means and engaging said pinion gear, said spring motor being so wound as to cause said pinion gear to travel along said rack and to move said carriage in a direction away from the fixed end of said flexible element, and (D) pulley means rotatively mounted on said carriage and engaging said flexible element.

23 A mechanism according to claim 2, wherein said engaging means has an elongated drive surface thereon and said actuating means has an annular drive surface thereon drivingly engaged with said elongated drive surface;

wherein said carriage means is movable along and adjacent to at least a portion of said path of movement of said movable means; and wherein said elongated drive surface constantly extends the length of said portion of said path traversed by said carriage means.

References Cited

UNITED STATES PATENTS

| 2,799,186 | 7/1957 | Siekmann. |
| 3,289,870 | 12/1966 | Quayle. |

FOREIGN PATENTS

| 570,402 | 7/1945 | Great Britain. |
| 979,862 | 1/1965 | Great Britain. |

RICHARD E. AEGERTER, *Primary Examiner.*

H. C. HORNSBY, *Assistant Examiner.*